US011133575B2

(12) United States Patent
Alrutz et al.

(10) Patent No.: US 11,133,575 B2
(45) Date of Patent: Sep. 28, 2021

(54) SMALL CELL BASE STATIONS WITH STRAND-MOUNTED ANTENNAS

(71) Applicant: CommScope Technologies LLC, Hickory, NC (US)

(72) Inventors: Mark E. Alrutz, Taylorsville, NC (US); Michael Guerin, Charles, IL (US)

(73) Assignee: CommScope Technologies LLC, Hickory, NC (US)

(*) Notice: Subject to any disclaimer, the term of this patent is extended or adjusted under 35 U.S.C. 154(b) by 0 days.

(21) Appl. No.: 16/765,246

(22) PCT Filed: Nov. 14, 2018

(86) PCT No.: PCT/US2018/060896
§ 371 (c)(1),
(2) Date: May 19, 2020

(87) PCT Pub. No.: WO2019/118116
PCT Pub. Date: Jun. 20, 2019

(65) Prior Publication Data
US 2020/0350661 A1  Nov. 5, 2020

Related U.S. Application Data

(60) Provisional application No. 62/597,045, filed on Dec. 11, 2017.

(51) Int. Cl.
*H01Q 1/24* (2006.01)
*H01Q 21/22* (2006.01)
(Continued)

(52) U.S. Cl.
CPC .............. *H01Q 1/246* (2013.01); *H01Q 1/14* (2013.01); *H01Q 21/22* (2013.01); *H04W 88/085* (2013.01)

(58) Field of Classification Search
CPC ........ H01Q 1/14; H01Q 1/246; H01Q 21/205; H01Q 21/22; H04W 88/085
(Continued)

(56) References Cited

U.S. PATENT DOCUMENTS 5,604,528 A * 2/1997 Edwards ................ H04N 7/167
340/5.28
5,856,618 A * 1/1999 Beishline ................ F16H 59/70
73/115.03

(Continued)

FOREIGN PATENT DOCUMENTS

WO      2019/118241 A1    6/2019

OTHER PUBLICATIONS

International Search Report and Written Opinion of the International Searching Authority, International Application No. PCT/US2018/060896, dated Mar. 26, 2019, 15 pp.
(Continued)

*Primary Examiner* — Tan H Trinh
(74) *Attorney, Agent, or Firm* — Myers Bigel, P.A.

(57) ABSTRACT

A small cell base station includes a remote radio head that is configured for mounting on an aerial strand, a phased array antenna and a mechanical linkage. The phased array antenna is hung below the remote radio head via the mechanical linkage, and the mechanical linkage is configured to allow the phased array antenna to move relative to the remote radio head.

13 Claims, 11 Drawing Sheets

(51) Int. Cl.
*H01Q 1/14* (2006.01)
*H04W 88/08* (2009.01)

(58) Field of Classification Search
USPC ................ 455/562.1, 575.7, 556.1
See application file for complete search history.

(56) References Cited

U.S. PATENT DOCUMENTS

| | | | |
|---|---|---|---|
| 6,181,297 B1 | 1/2001 | Leisten | |
| 6,437,742 B1* | 8/2002 | Niesen | G01S 3/02 |
| | | | 342/418 |
| 2004/0174317 A1 | 9/2004 | Dearnley et al. | |
| 2004/0233120 A1* | 11/2004 | Ryan | H01Q 9/34 |
| | | | 343/878 |
| 2006/0152410 A1* | 7/2006 | Shi | H01Q 3/26 |
| | | | 342/359 |
| 2007/0146222 A1* | 6/2007 | Mansour | H01Q 1/3283 |
| | | | 343/757 |
| 2007/0279495 A1* | 12/2007 | Howald | H04B 7/082 |
| | | | 348/193 |
| 2009/0304055 A1* | 12/2009 | Nino | H04W 24/02 |
| | | | 375/222 |
| 2011/0113605 A1* | 5/2011 | Plaza Baonza | B64G 1/645 |
| | | | 24/603 |
| 2011/0298682 A1 | 12/2011 | Plet et al. | |
| 2011/0309996 A1* | 12/2011 | Abumrad | H01Q 1/24 |
| | | | 343/872 |
| 2012/0069882 A1 | 3/2012 | Nino et al. | |
| 2012/0163201 A1* | 6/2012 | Williams | H04N 7/102 |
| | | | 370/252 |
| 2013/0031947 A1* | 2/2013 | Tingley | B23P 15/00 |
| | | | 72/466.2 |
| 2014/0118191 A1* | 5/2014 | Smith | H01Q 19/30 |
| | | | 342/372 |
| 2014/0128032 A1 | 5/2014 | Muthukumar | |
| 2014/0132473 A1 | 5/2014 | Isom | |
| 2014/0306852 A1* | 10/2014 | Peterson | H01Q 1/04 |
| | | | 343/709 |
| 2014/0313080 A1* | 10/2014 | Smith | H01Q 19/32 |
| | | | 342/372 |
| 2015/0067755 A1* | 3/2015 | Conroy | H04N 21/6156 |
| | | | 725/127 |
| 2015/0091755 A1 | 4/2015 | Chawgo | |
| 2016/0134006 A1* | 5/2016 | Ness | H01Q 3/02 |
| | | | 343/880 |
| 2016/0161053 A1 | 6/2016 | Allen | |
| 2016/0248170 A1 | 8/2016 | Bisiules et al. | |
| 2017/0033465 A1* | 2/2017 | Henry | H04B 3/52 |
| 2017/0194704 A1 | 7/2017 | Chawgo et al. | |
| 2017/0201310 A1* | 7/2017 | Nardozza | H04B 7/086 |
| 2017/0222385 A1* | 8/2017 | Favie | E04H 4/1645 |
| 2017/0317766 A1 | 11/2017 | Vella-Coleiro et al. | |
| 2018/0331721 A1* | 11/2018 | Adriazola | H01Q 1/12 |
| 2020/0358476 A1* | 11/2020 | Chamberlain | H04B 7/0617 |

OTHER PUBLICATIONS

International Search Report and Written Opinion of the International Searching Authority, International Application No. PCT/US2018/063986, dated Feb. 12, 2019, 10 pp.

* cited by examiner

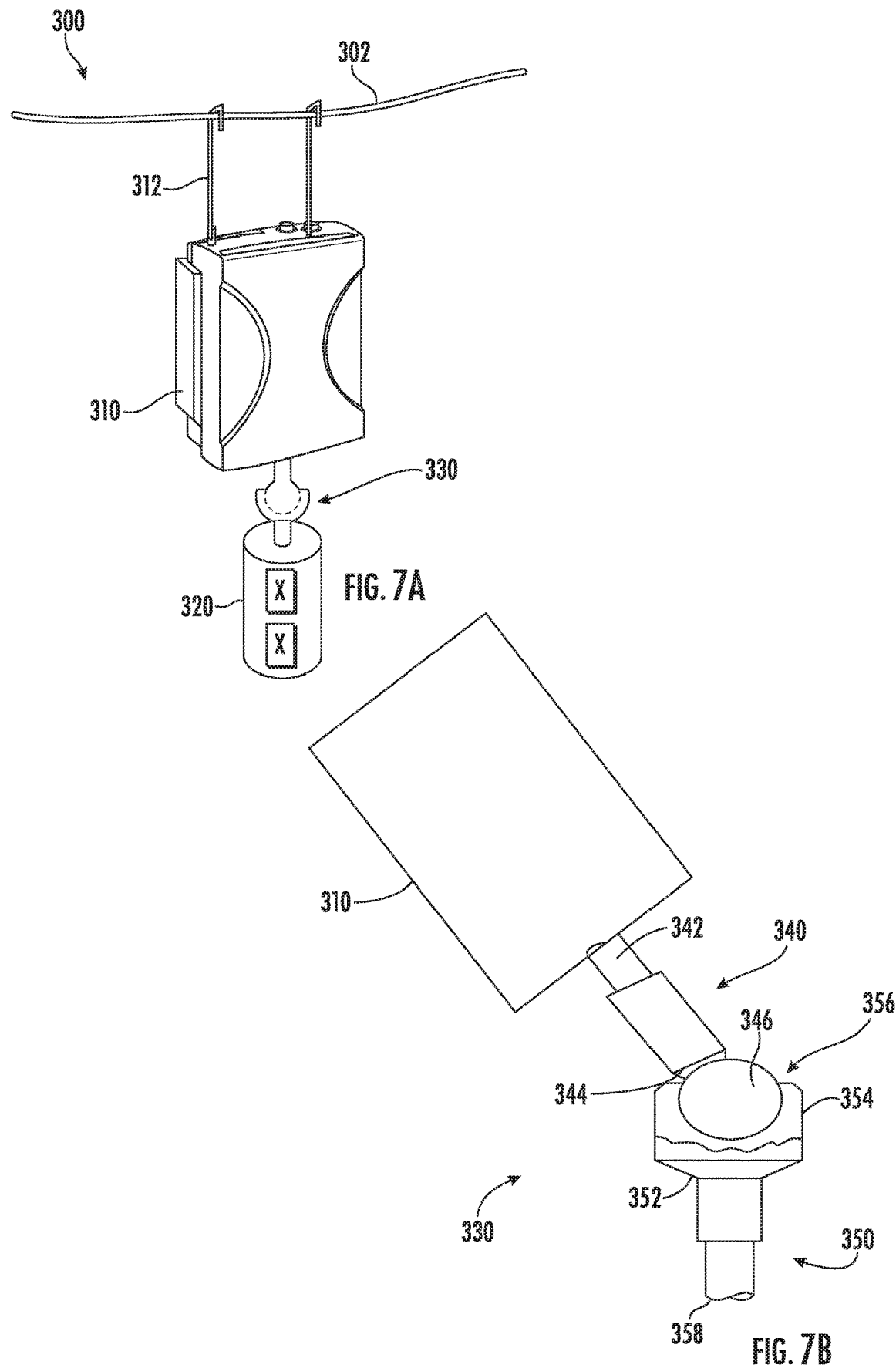

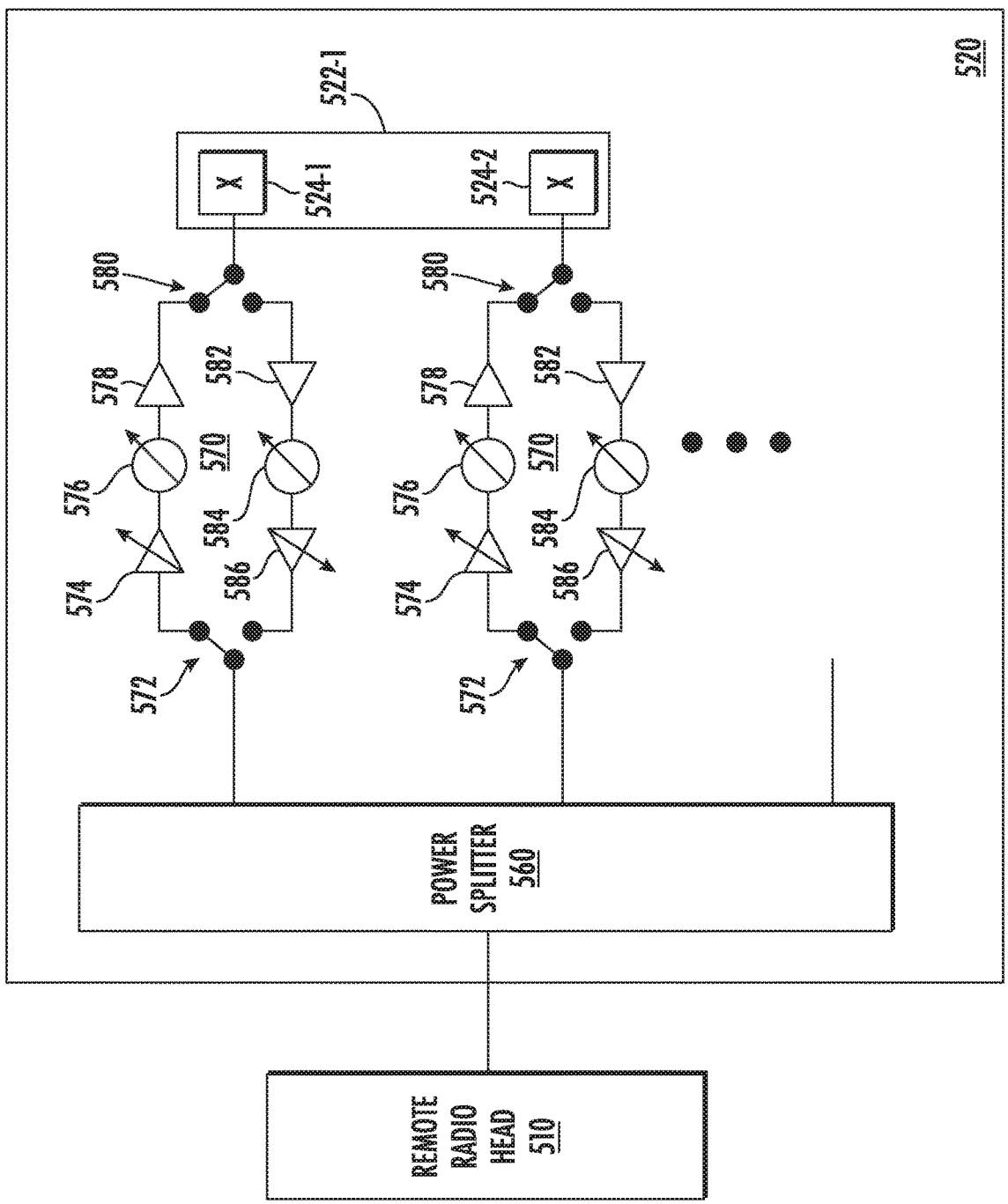

SMALL CELL BASE STATIONS WITH STRAND-MOUNTED ANTENNAS

CROSS-REFERENCE TO RELATED APPLICATIONS

The present application is a 35 U.S.C. § 371 national stage application of PCT Application No. PCT/US2018/060896, filed on Nov. 14, 2018, which itself claims priority under 35 U.S.C. § 119 to U.S. Provisional Patent Application Ser. No. 62/597,045, filed Dec. 11, 2017, the entire contents of both of which are incorporated herein by reference as if set forth in their entireties.

FIELD

The present invention relates to cellular communications systems and, more particularly, to small cell cellular base stations.

BACKGROUND

Cellular communications systems are well known in the art. In a typical cellular communications system, a geographic area is divided into a series of regions that are referred to as "cells," and each cell is served by a base station. Typically, a cell may serve users who are within a distance of, for example, 1-20 kilometers from the base station, although smaller cells are typically used in urban areas to increase capacity. The base station may include baseband equipment, radios and antennas that are configured to provide two-way radio frequency ("RF") communications with fixed and mobile subscribers ("users") that are positioned throughout the cell. The antennas are often mounted on a tower or other raised structure, with the radiation beam ("antenna beam") that is generated by each antenna directed outwardly to cover the cell or a portion thereof. Typically, a base station antenna includes one or more phase-controlled arrays of radiating elements, with the radiating elements arranged in one or more vertical columns when the antenna is mounted for use. Herein, "vertical" refers to a direction that is perpendicular relative to the plane defined by the horizon.

In order to increase capacity, cellular operators have been deploying so-called "small cell" cellular base stations. A small cell base station refers to a lower power base station that may operate in the licensed and/or unlicensed spectrum that has a much smaller range than a typical "macrocell" base station. A small cell base station may be designed to serve users who are within short distances from the small cell base station (e.g., tens or hundreds of meters). Small cells may be used, for example, to provide cellular coverage to high traffic areas within a macrocell, which allows the macrocell base station to offload much or all of the traffic in the vicinity of the small cell to the small cell base station. Small cells may be particularly effective in Long Term Evolution ("LTE") cellular networks in efficiently using the available frequency spectrum to maximize network capacity at a reasonable cost. Small cell base stations typically employ a single antenna that provides full 360 degree coverage in the azimuth plane and a suitable beamwidth in the elevation plane to cover the designed area of the small cell. In many cases, the small cell antenna will be designed to have a small downtilt in the elevation plane to reduce spill-over of the antenna beam of the small cell antenna into regions that are outside the small cell and also for reducing interference between the small cell and the overlaid macrocell.

SUMMARY

Pursuant to embodiments of the present invention, small cell base stations are provided that include a remote radio head that is configured for mounting on an aerial strand, a phased array antenna and a mechanical linkage. The phased array antenna is suspended below the remote radio head via the mechanical linkage, and the mechanical linkage is configured to enable the phased array antenna to move relative to the remote radio head.

In some embodiments, the mechanical linkage may comprise a ball-and-socket connector, a hinge or at least one spring-loaded piston.

In some embodiments, the phased array antenna may include ballast material in a lower portion thereof.

In some embodiments, the mechanical linkage may be configured to enable the phased array antenna to substantially remain in a pre-determined orientation as the remote radio head sways.

Pursuant to further embodiments of the present invention, small cell base stations are provided that include a remote radio head that is configured for mounting on an aerial strand, an orientation sensor that is configured to generate orientation data, a controller that is configured to receive the orientation data from the orientation sensor, and a phased array antenna having at least two columns of radiating elements. The controller is configured to adjust at least one of amplitudes and phases of sub-components of an RF signal that are passed to the respective radiating elements in response to the orientation data.

In some embodiments, the controller may be configured to adjust the phases of sub-components of the RF signal that are passed to the respective radiating elements in response to the orientation data in order to compensate for sway-induced movement of the phased array antenna. In some embodiments, the adjustment to the phases of the sub-components of the RF signal may adjust an elevation angle of an antenna beam generated by the phased array antenna.

In some embodiments, the orientation sensor may comprise a gyroscope, an accelerometer and/or an inclinometer.

In some embodiments, the controller may be configured to adjust the amplitudes of a sub-set of the sub-components of the RF signal that are passed to the respective radiating elements in response to the orientation data.

Pursuant to still further embodiments of the present invention, small cell base stations are provided that include a remote radio head that is configured for mounting on an aerial strand, a phased array antenna having at least two columns of radiating elements, an orientation sensor that is configured to generate orientation data, a controller that is configured to receive the orientation data from the orientation sensor, and at least one actuator that is coupled to the phased array antenna. The at least one actuator is configured to adjust positions of the radiating elements with respect to the remote radio head in response to the orientation data.

In some embodiments, the at least one actuator may be configured to adjust the positions of the radiating elements in response to the orientation data in order to compensate for sway-induced movement of the phased array antenna.

In some embodiments, the at least one actuator may be configured to adjust the positions of the radiating elements by adjusting a position of the phased array antenna relative to the remote radio head.

In some embodiments, the at least one actuator may comprise a plurality of actuators that are configured to adjust the positions of each radiating element in response to the orientation data.

In some embodiments, the orientation sensor may comprise a gyroscope, an accelerometer and/or an inclinometer.

Pursuant to additional embodiments of the present invention, strand-mounted small cell base stations are provided that include an aerial strand that extends between a first pole and a second pole, a remote radio head that is mounted on the aerial strand, and a base station antenna that is mounted on the aerial strand separate from the remote radio head. The base station antenna is mounted on the aerial strand between the first pole and the second pole and the base station antenna is closer to one of the first pole and the second pole than the remote radio head is to either the first pole or the second pole.

In some embodiments, the base station antenna may be mounted within six feet of either the first pole or the second pole.

In some embodiments, a first portion of the base station antenna may extend above the aerial strand and a second portion of the base station antenna may extend below the aerial strand.

In some embodiments, the base station antenna may be a phased array antenna.

In some embodiments, the base station antenna may be suspended below the remote radio head via a mechanical linkage. In some such embodiments, the mechanical linkage may be a ball-and-socket connector.

BRIEF DESCRIPTION OF THE DRAWINGS

FIG. 7A is a schematic diagram of a strand-mounted small cell cellular base station according to embodiments of the present invention that is mounted below a remote radio head using a ball-and-socket connector.

FIG. 7B is an enlarged cross-sectional view of the ball-and-socket connection of FIG. 7A.

FIG. 9B is a block diagram that illustrates an example implementation of the active radiating elements included in the base station antenna of FIG. 9A.

DETAILED DESCRIPTION

Figure 1:
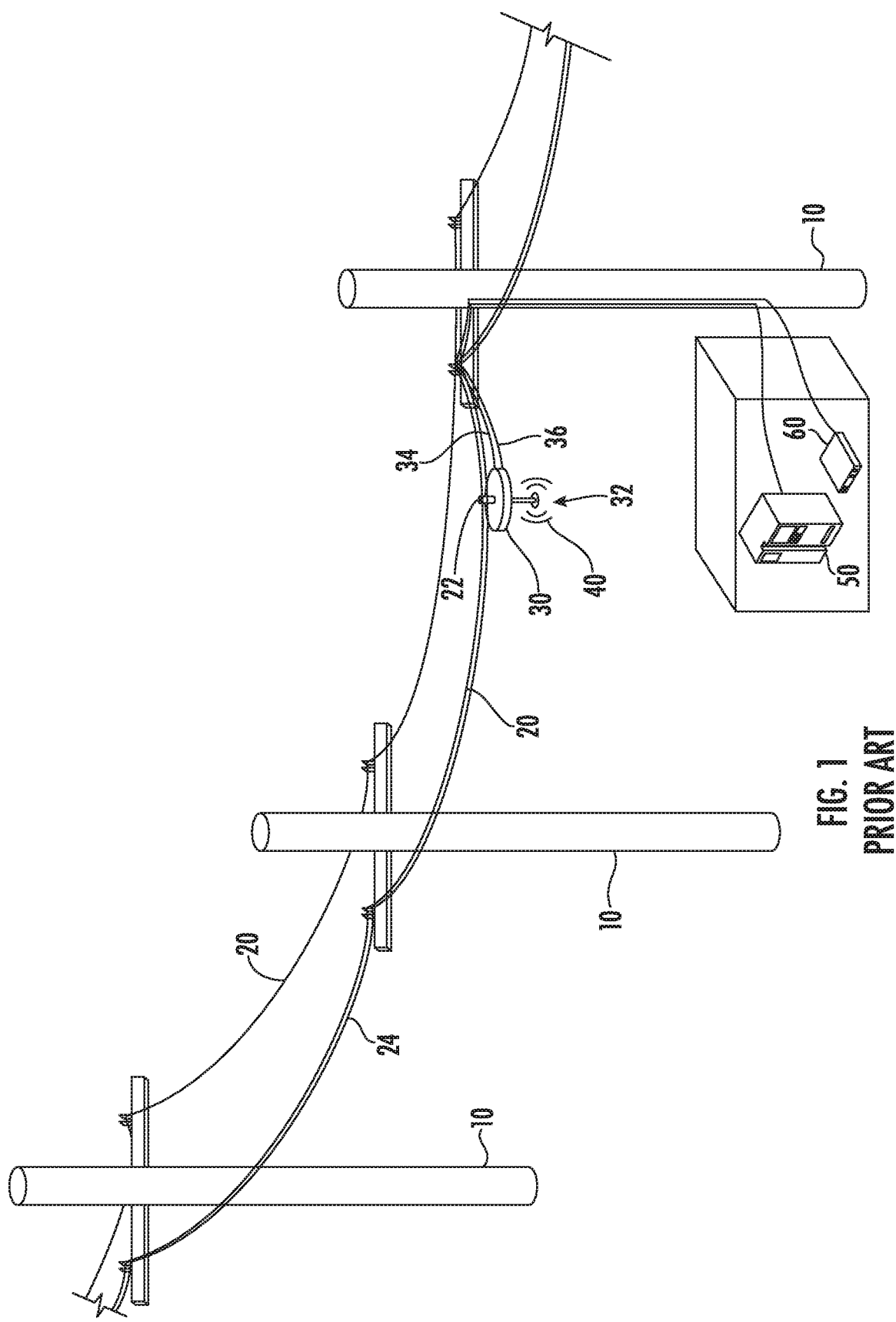
FIG. 1 is a schematic diagram illustrating a conventional strand-mounted WiFi access point.

Deploying small cell base stations can be a cost-effective way of increasing the capacity of a cellular communications network. Moreover, small cell base stations are now being designed that operate in unlicensed frequency bands that are at higher frequencies than the conventional cellular frequency bands. For example, small cell base stations are now being contemplated that operate in the 3.5 GHz and the 5.0 GHz frequency bands. Since the size of the radiating elements and various other components of a base station antenna generally decrease with increasing frequency, the small cell base station antennas that operate in these higher frequency bands can be much more compact as compared to conventional base station antennas that operate, for example, at frequencies in one or more portions of the 500 MHz to 2.7 GHz frequency range that is typically used for cellular communications.

As noted above, base station antennas are typically mounted in elevated locations to increase coverage and/or to minimize scattering of the RF signals by buildings, vegetation or terrain features. If a large number of small cell base stations are to be deployed, this requires leasing a large number of elevated mounting locations. In many cases, small cell base stations are mounted on utility poles such as streetlamps, poles supporting electrical power wires or poles supporting telecommunications cables. However, mounting small cell remote radio heads and antennas on such utility poles typically requires zoning approval and, in many cases, may require leasing space on the pole. As such, using utility poles as mounting locations for small cell antennas may be costly, time-consuming and/or administratively burdensome.

Cable television network operators own and operate extensive hybrid fiber/coaxial cable networks that are used to distribute cable television and broadband Internet signals to subscribers. While the fiber optic cables and coaxial cables are often buried in underground conduits, in older networks and urban areas the cables are often mounted on telecommunication poles. High-strength wires that are referred to as "strands" are typically strung between telecommunication poles. The telecommunication cables are hung from and supported by the strands. Typically, the telecommunications operator owns the strands, and hence may freely mount equipment on the strands. Moreover, while regulations may limit the physical size of equipment that is suspended from pole-mounted strands, as long as the equipment meets the limits on the physical dimensions, then hanging equipment from strands does not implicate zoning regulations.

Some cable television network operators also now operate as mobile virtual network operators. A mobile virtual network operator refers to a cellular communications provider that primarily or exclusively leases cellular capacity from other cellular operators who own and operate extensive cellular networks. Cable television network operators that operate as mobile virtual network operators are deploying extensive WiFi networks which allow the cable television operator to use the WiFi networks to carry much of the cellular traffic, reducing the amount of cellular resources that they need to lease from true mobile network operators. A WiFi network includes a plurality of WiFi access points which are used to provide users access to the WiFi network. A WiFi access point refers to a wireless router that operates in one or more of the WiFi frequency bands. It will also be appreciated that entities other than cable television network operators such as, for example, telephone network operators, may also operate WiFi networks.

Pole-mounted strands have turned out to be a convenient location for cable television network operators who also operate as mobile virtual network operators or other types of operators to mount WiFi access points. As noted above, in many situations the operator may own the strands, and hence by strand-mounting the WiFi access points the operator may avoid the need to lease mounting locations for the WiFi access points, which can be time consuming and expensive (due to the large number of WiFi access points and administrative burden of negotiating leases). Additionally, many strands carry coaxial cables which can carry sufficient power to operate a WiFi access point. Moreover, the strands are typically elevated about 20-30 feet above the ground, which improves the coverage provided by each WiFi access point. Finally, as noted above, typically if the size of the WiFi access point is within certain dimensions then no zoning regulations will apply.

FIG. 1 is a schematic view of a conventional strand-mounted WiFi access point. As shown in FIG. 1, strands 20 may extend between utility poles 10. Each strand 20 may comprise, for example, a steel cable. Telecommunication cables 24 may be hung from the strand 20 via cable loops (not shown). The strand 20 may carry the weight of the telecommunication cables 24 in order to protect the telecommunication cables 24 from damage. As is further shown in FIG. 1, a WiFi access point 30 may be mounted on one of the strands 20. The WiFi access point 30 may be hung from the strand 20 by one or more brackets 22. The WiFi access point 30 may have an antenna 32 that generates an omnidirectional antenna beam 40 to provide coverage to users within range of the WiFi access point 30. A power cable 34 may be routed between a ground-based power supply 50 that may be located at the base of one of the utility poles 10 and the WiFi access point 30 to power the WiFi access point 30. In other embodiments, power may be provided to the WiFi access point 30 from a power supply (not shown) at a remote location over one of the telecommunication cables 24 (e.g., over a coaxial cable). A data cable 36 may also be provided that is connected between the WiFi access point 30 and ground-based equipment such as, for example, a router 60. The data cable 36 may pass data between the WiFi access point 30 and the router 60.

Pursuant to embodiments of the present invention, strand-mounted small cell base station antennas are provided. Strands provide a convenient, low-cost location for mounting antennas and remote radio heads for small cell base stations, particularly as the size of such equipment decreases.

Figure 2:
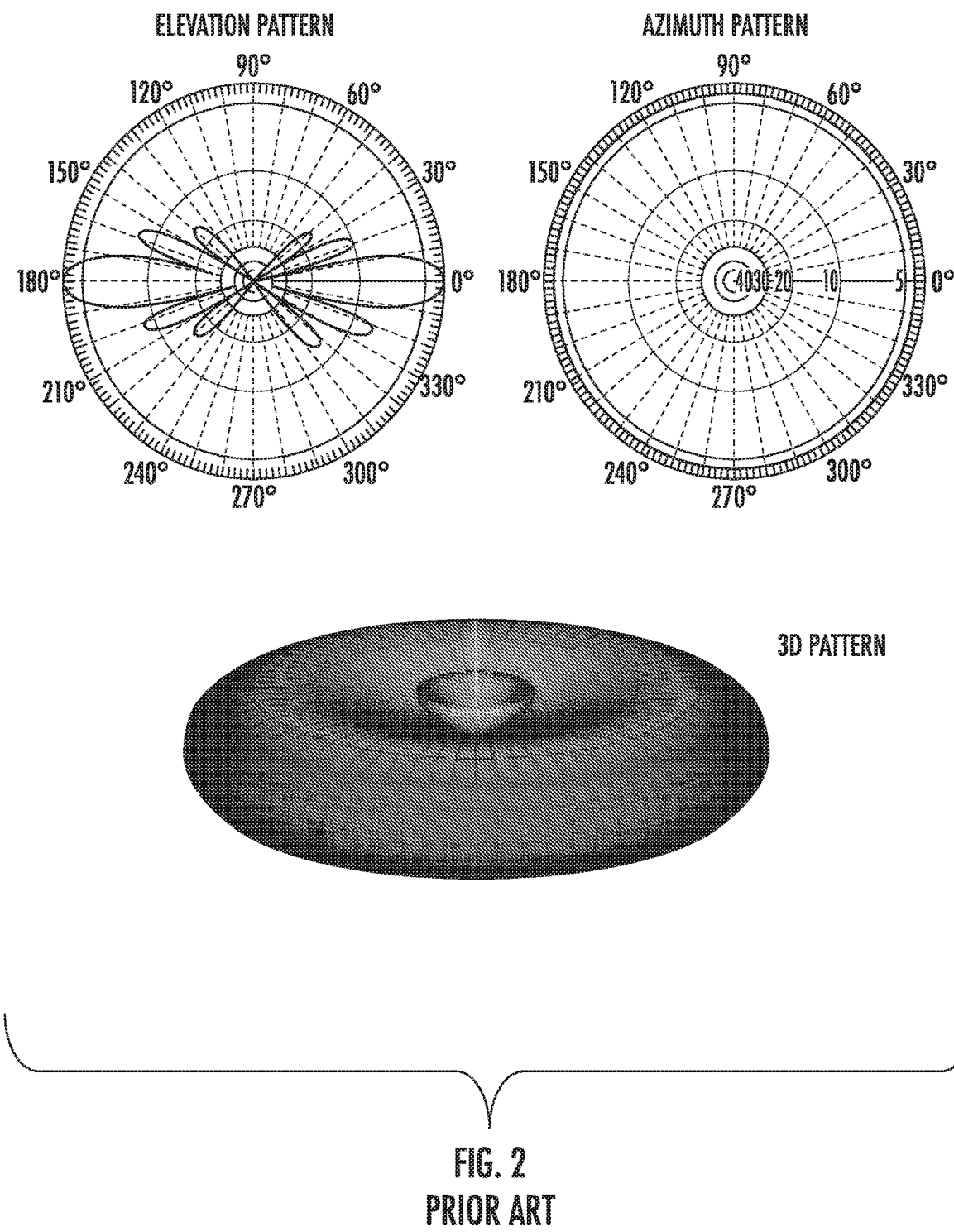
FIG. 2 is a schematic diagram illustrating a radiation pattern of a conventional small cell antenna, and also includes graphs of the corresponding azimuth and elevation patterns of the antenna beam.

One potential problem, however, with the concept of strand-mounting small cell base station antennas is that the strand and/or base station equipment that is mounted on the strand can sway in response to wind or other forces. If the small cell antenna has an omnidirectional antenna pattern in both the azimuth and elevation planes, then such sway may not materially impact the coverage of the small cell antenna. However, in order to increase capacity and/or to reduce interference with neighboring cells, small cell antennas are now being developed that have directional antenna patterns. For example, a small cell antenna may be designed to have an omnidirectional antenna pattern in the azimuth plane, but a directional antenna pattern in the elevation plane that concentrates the RF energy at a range of elevation angles that are, for example, within about 10°-15° of the horizon. FIG. 2 graphically depicts such an antenna pattern, which as shown may have a generally toroidal shape. FIG. 2 also includes graphs of the azimuth and elevation patterns for the illustrated antenna beam that show how the antenna beam provides 360 degree coverage in the azimuth plane while being directional in the elevation plane. Such an antenna pattern may provide increased antenna gain to locations within the small cell, particularly at the edges thereof, while limiting the amount of radiation emitted upwardly or into the ground near the base of the antenna mounting location. The azimuth pattern is generated by taking a horizontal cross-section through the middle of the three-dimensional antenna pattern, and the elevation pattern is generated by taking a vertical cross-section through the middle of the three-dimensional antenna pattern.

Figure 3:
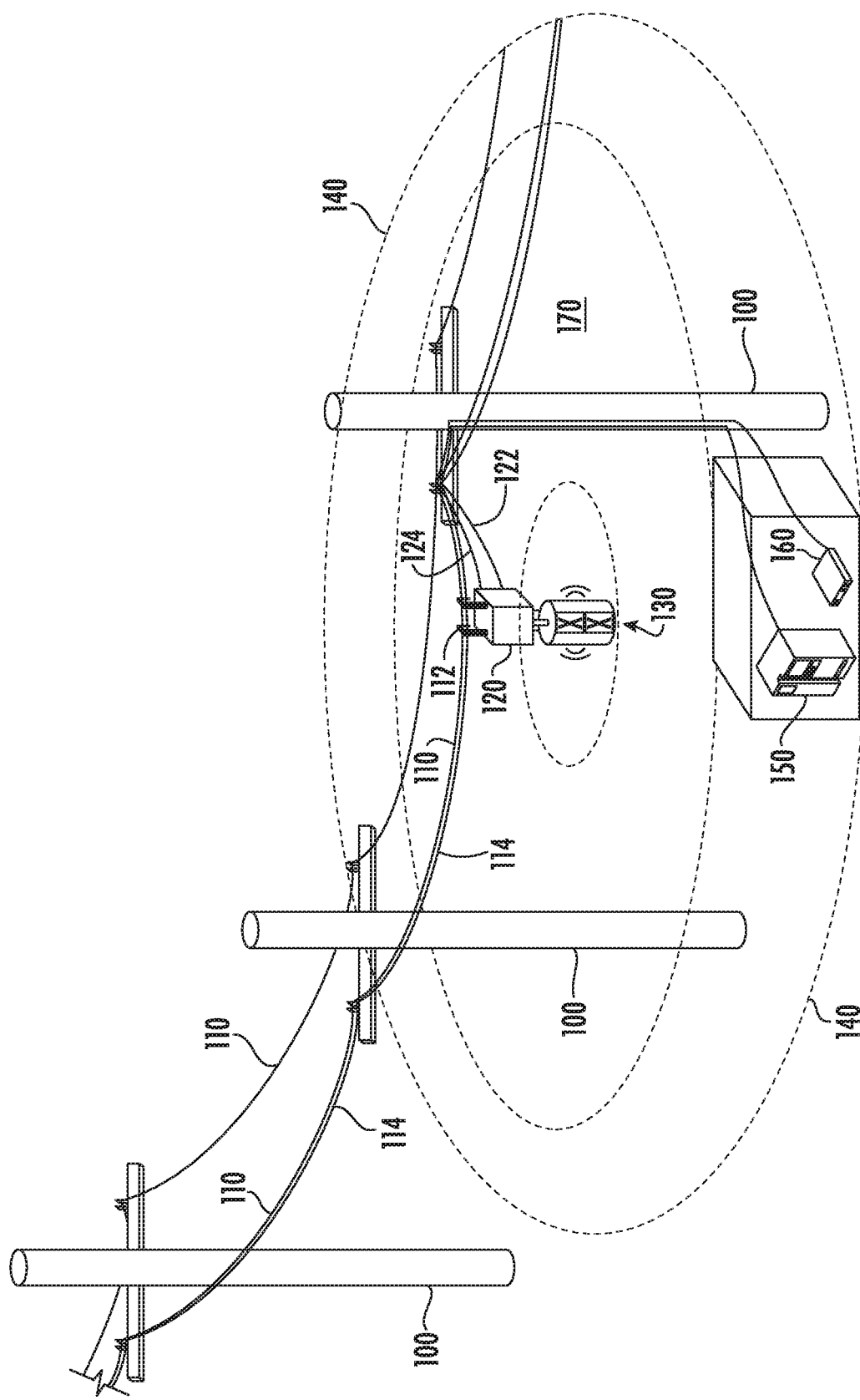
FIG. 3 is a schematic diagram illustrating a strand-mounted small cell cellular base station.

FIG. 3 is a schematic diagram illustrating a small cell base station having a strand-mounted base station antenna. As shown in FIG. 3, a remote radio head 120 is mounted on a strand 110 that is supported between two utility poles 100. The remote radio head 120 may be hung from the strand 110 by one or more brackets 112. Telecommunication cables 114 may also be hung from the strand 110. The remote radio head 120 may be, for example, powered via a strand mounted cable or a separate power cable. In the example of FIG. 3, the remote radio head 120 is shown being powered by a power cable 122. The power cable 122 may be supported by the strand 110 and may, for example, run down one of the poles 100 where it may be connected to a power supply 150. In other embodiments, the remote radio head 120 may be powered by, for example, a strand-mounted coaxial cable (not shown) that receives a power signal at a remote location. A data cable 124, which may be, for example, a fiber optic cable, may also be hung from the strand 110 and routed down one of the poles 100 where it is connected to ground-based equipment 160 such as baseband and/or backhaul equipment. It will be appreciated, however, that in other embodiments the baseband/backhaul equipment 160 may be strand-mounted as well and powered by, for example, a strand-mounted cable. A small cell antenna 130 is mounted to hang below the remote radio head 120. The small cell antenna 130 may be mounted vertically so that its longitudinal axis and/or the axes defined by the linear arrays of radiating elements included in the small cell antenna 130 are generally perpendicular to the plane defined by the horizon.

As is further shown in FIG. 3, the small cell antenna 130 generates an antenna beam 140. In FIG. 3, it is assumed that the small cell antenna generates a generally toroidal antenna beam 140 (shown schematically in FIG. 3 using dashed lines) that provides full 360° coverage in the azimuth plane. The shape of the antenna beam 140 may be, for example, similar to the shape of the antenna beam shown in FIG. 2.

The small cell antenna 130 may be designed so that the antenna beam 140 has a small electrical and/or mechanical downward tilt in the elevation plane so that the peak magnitude of the antenna beam is pointed at an elevation angle of less than 0 degrees (e.g., an elevation angle of between −1 degree and −15 degrees). When the "downtilt" is applied electrically (by applying a phase taper to the sub-components of an RF signal that are fed to the radiating elements of each vertical array included in small cell antenna 130), the antenna beam 140 may have a slight conical shape so that the antenna beam 140 tends to point into the ground at or near an edge of the region (i.e., the cell 170) covered by the small cell base station. Such a downtilt may facilitate providing high antenna gain for communicating with users near the edge of the cell 170 while reducing the amount of radiation that leaks into neighboring cells.

In FIG. 3, the small cell antenna 130 and the antenna beam 140 that it produces are shown assuming that the strand 110 is not swaying. As show in FIG. 3, when the small cell antenna 130 is not affected by sway, the antenna beam 140 having the above-described toroidal pattern extends outwardly generally parallel to the plane defined by the horizon, with the slight downwardly-extending conical shape causing the antenna beam 140 to terminate into the ground at or near the edges of the cell 170. Thus, under these conditions, the antenna beam 140 will tend to provide coverage to the edge of the cell 170 while not emitting significant radiation into neighboring cells.

Unfortunately, pole-mounted strands such as strand 110 may sway, particularly on windy days. The sway may be a side-to-side sway or an up-down sway that is typically referred to as "galloping." When base station equipment such as remote radio heads 120 and/or antennas 130 are mounted on a strand 110, the large surface area of these devices may absorb higher amounts of wind force, and hence increase the amount of sway. This may particularly be true if the strand-mounted equipment 120, 130 is mounted to the strand 110 via brackets 112 so that the equipment 120, 130 hangs below the strand 110. When the equipment 120, 130 is mounted in this configuration, the equipment 120, 130 may sway on the strand 110, and hence the sway experienced by the equipment 120, 130 will be the combination of the sway of the strand 110 and the sway of the equipment 120, 130 on the strand 110. This sway may negatively impact the performance of a small cell base station.

Figure 4:
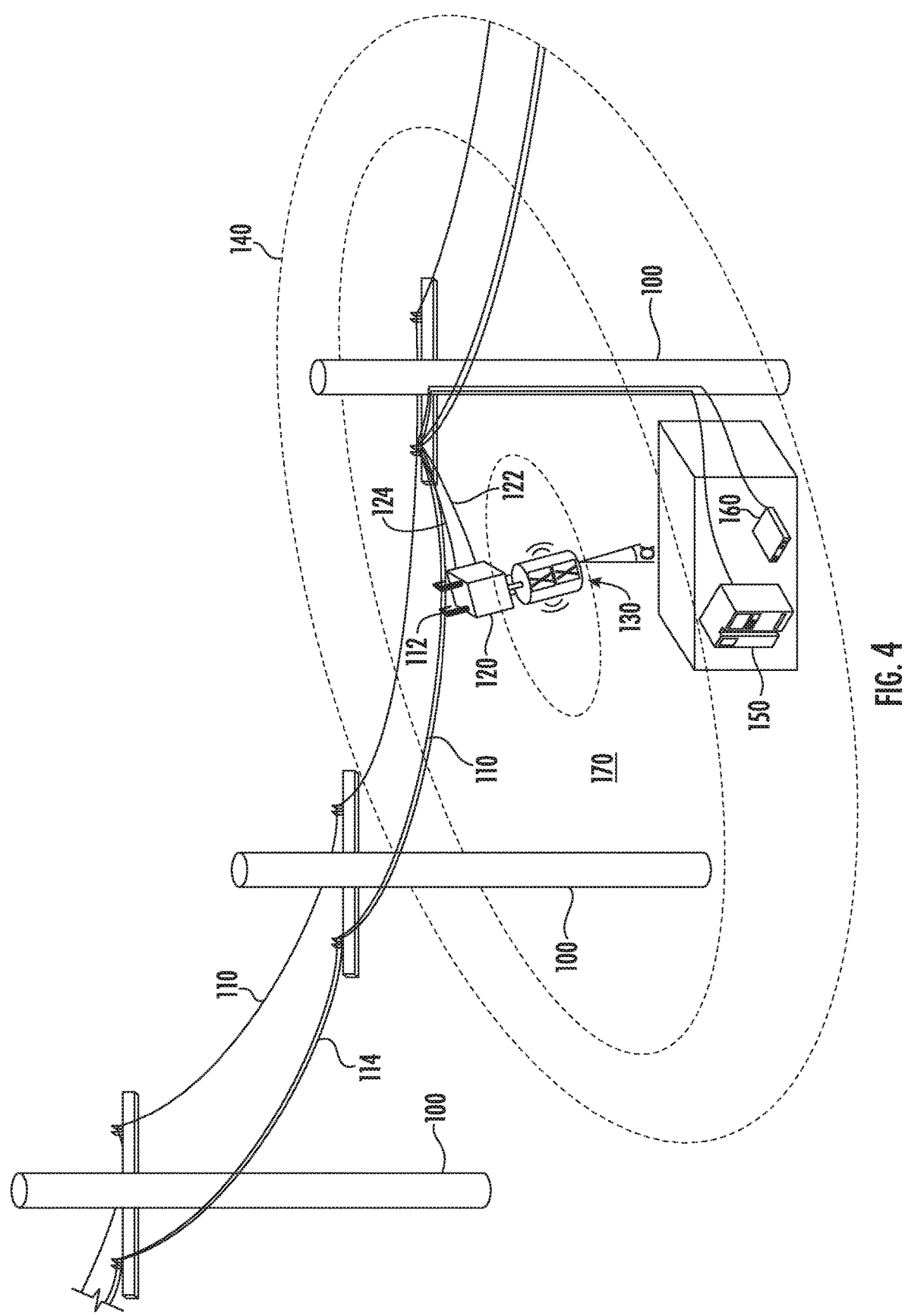
FIG. 4 is a schematic diagram illustrating how the antenna beam of the strand-mounted small cell cellular base station of FIG. 3 may move as a result of the strand and/or the remote radio head swaying in response to wind.

FIG. 4 is a schematic diagram illustrating how sway may negatively impact the coverage of a strand-mounted small cell antenna 130. As shown in FIG. 4, when the strand 110 and/or the remote radio head 120 sways, the small cell antenna 130 will also sway and consequently the longitudinal axis of the small cell antenna 130 will no longer be perpendicular to the plane defined by the horizon, but instead will be tilted at an angle α from an axis that is perpendicular to the plane defined by the horizon. This sway-induced tilt results in a corresponding tilt to the orientation of the antenna beam 140. As shown in FIG. 4, this tilt causes one side of the antenna beam 140 (the left side in FIG. 4) to point downwardly, which results in the peak radiation of the antenna beam 140 pointing into the ground in the interior of the cell 170, which degrades coverage at the edge of the portion of the cell that is on the left side of the small cell antenna 130. The tilt causes the other side of the antenna beam 140 (the right side in FIG. 4) to point upwardly, which results in the peak radiation of the antenna beam 140 pointing into the sky. This may severely degrade coverage on the left side of the cell 170, and may result in interference in neighboring cells 170. Thus, FIG. 4 shows how sway may be problematic for strand-mounted small cell antennas having directional radiation patterns.

Pursuant to embodiments of the present invention, strand-mountable small cell antennas are provided that include mechanisms to reduce sway and/or compensate for sway. In some embodiments, the strand-mountable small cell antennas have orientation sensors that can detect an orientation of the small cell antenna. The orientation sensor may comprise, for example, a gyroscope, an accelerometer, a magnetometer, an inclinometer, or combinations thereof. In such embodiments, the small cell antenna may further include a controller that may receive orientation data from the orientation sensor and may alter the magnitudes and/or phases of the sub-components of the radiating elements of the small cell antenna in order to electronically adjust the antenna pattern to counter the negative effects of sway. In other embodiments, the small cell antenna may alternatively include one or more motors or other actuators that adjust a physical orientation of the antenna in response to an orientation controller in order to maintain the physical orientation of the antenna despite the effects of sway.

In other embodiments, the small cell antenna may be designed to have reduced sway. For example, in some embodiments, the small cell antenna may be weighted and hung from the remote radio head using a ball-and-socket connection, hinges, spring-loaded pistons, slider-crank mechanisms and the like or other mechanical connections that allow the small cell antenna to hang generally vertically despite movement (e.g., sway) of the remote radio head. In other embodiments, the small cell antenna may be mounted directly to the strand, and the remote radio head may be mounted at a different location on the strand or mounted elsewhere (e.g., on the ground with the baseband equipment). The small cell antenna may also be hung from the strand at a location that is close to one of the poles, which may further reduce sway.

Example embodiments of the invention will now be discussed in more detail with reference to FIGS. 5A-11.

Strand-mounted small cell base stations offer the opportunity for operators of cellular communications networks to add capacity to their networks at reduced cost and/or with faster installation times. However, as discussed above, wind-induced sway of the strand-mounted antenna may cause the antenna beam to point in unintended directions, reducing the antenna gain within the small cell and potentially increasing interference to neighboring cells. Embodiments of the present invention provide small cell antennas that can reduce and/or counteract the effects of such sway so that the antenna beam will illuminate a desired area despite the effects of sway.

Before describing the techniques according to embodiments of the present invention for dealing with sway, it is helpful to further describe the components of an example small cell base station antenna.

Figure 5A:
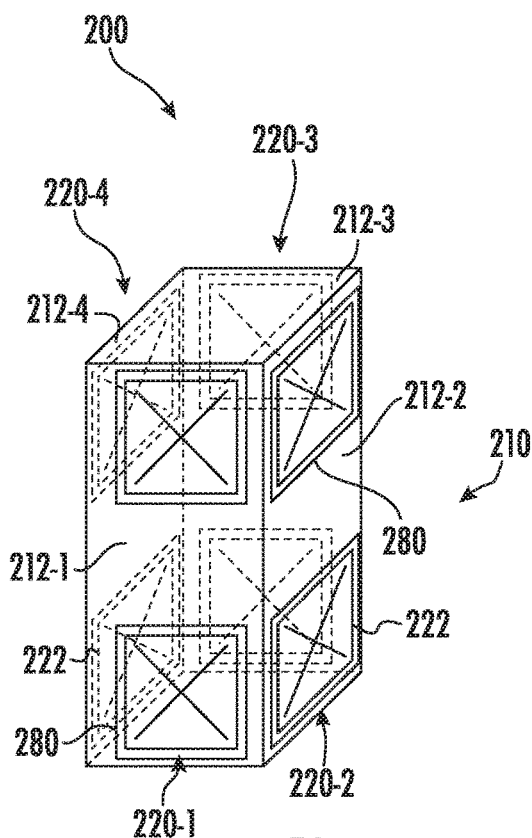
FIG. 5A is a schematic diagram of a small cell base station antenna that is suitable for strand-mounting.
Figure 5B:
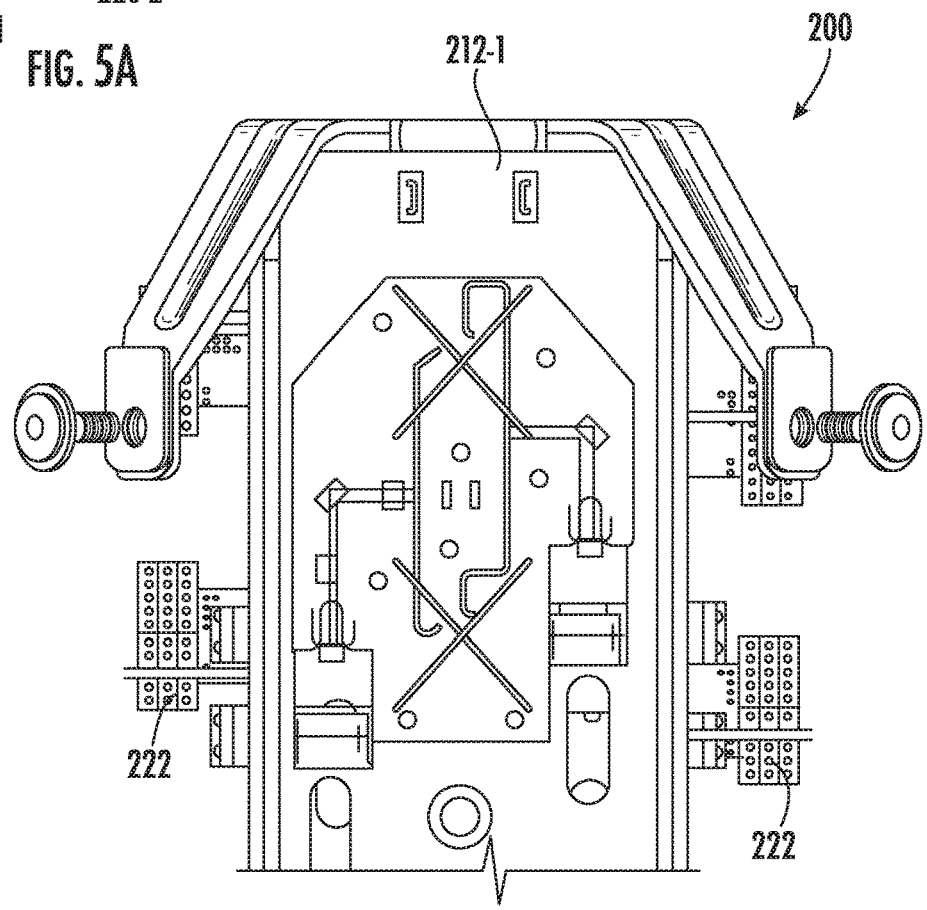
FIG. 5B is a side view of an example embodiment of the small cell antenna of FIG. 5A.
Figure 5C:
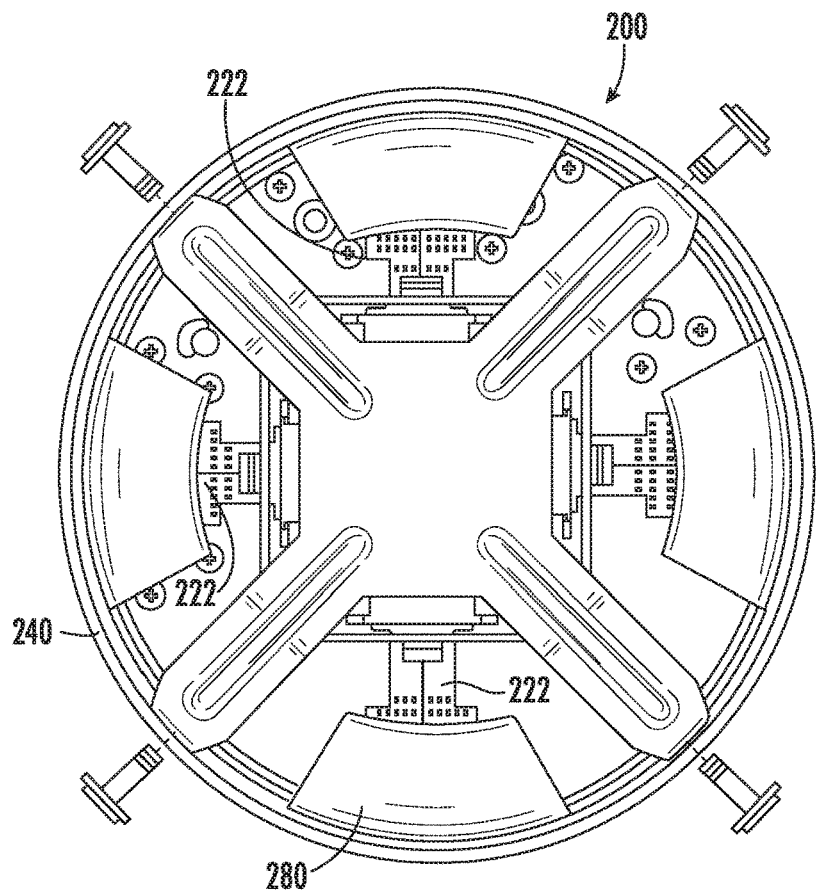
FIG. 5C is a top view of the small cell antenna of FIG. 5B.

FIGS. 5A-5C illustrate a small cell base station antenna 200 that can be used in any of the embodiments of the present invention described herein. FIGS. 5A-5C do not illustrate any of the techniques for reducing the impact of sway, and instead focus on the electrical components of the antenna 200 that are used to generate a suitable antenna beam. FIG. 5A is a schematic diagram of the small cell base station antenna 200 that illustrates the columns of radiating elements included therein. FIGS. 5B-5C are drawings of an example embodiment of the small cell antenna 200. In particular, FIG. 5B is a side view of the antenna 200 with the radome removed to expose internal elements of the antenna, while FIG. 5C is a top view of the small cell antenna 200.

As shown in FIGS. 5A-5C, the small cell antenna 200 may include a rectangular tubular reflector assembly 210 that has four vertically-oriented linear arrays 220-1 through 220-4 of radiating elements 222 mounted thereon Each face of the reflector assembly 210 may comprise a reflective backplane 212-1 through 212-4 that reflects radiation outwardly and that also serves as a ground plane for the radiating elements 222 mounted thereon. It should be noted that herein, when multiple like or similar elements are provided, they may be labelled in the drawings using a two-part reference numeral (e.g., backplane 212-2). Such elements may be referred to herein individually by their full reference numeral (e.g., backplane 212-2) and may be referred to collectively by the first part of their reference numeral (e.g., the backplanes 212).

Each linear array 220 includes multiple radiating elements 222 that are arranged along a vertical axis with respect to the horizon when the base station antenna 200 is mounted for use. In the depicted embodiment, each linear array 220 includes a two radiating elements 222, but it will be appreciated that other numbers of radiating elements 222 may be included in the linear arrays 220 in other embodiments. Any appropriate radiating element 222 may be used including, for example, dipole, cross-dipole and/or patch radiating elements. Each of the radiating elements 222 may be identical. The radiating elements 222 may extend forwardly from the respective backplanes 212. In the depicted embodiment, each radiating element 222 includes a pair of dipole radiators that are arranged orthogonally to each other at angles −45° and the +45° with respect to the longitudinal (vertical) axis of the antenna 200. The dipoles are formed on a pair of printed circuit boards that are mated together so as to form an "X" shape when viewed from the front. The dipoles may be designed, for example, to transmit and receive signals in the 3.5 GHz frequency band or the 5.0 GHz frequency band in some embodiments.

A radome 240 (see FIG. 5C) may surround and protect the radiating elements and other components of the antenna 200. It will be appreciated that the base station antenna 200 may also include a number of other components that are not depicted in FIGS. 5A-5C.

Figure 6:
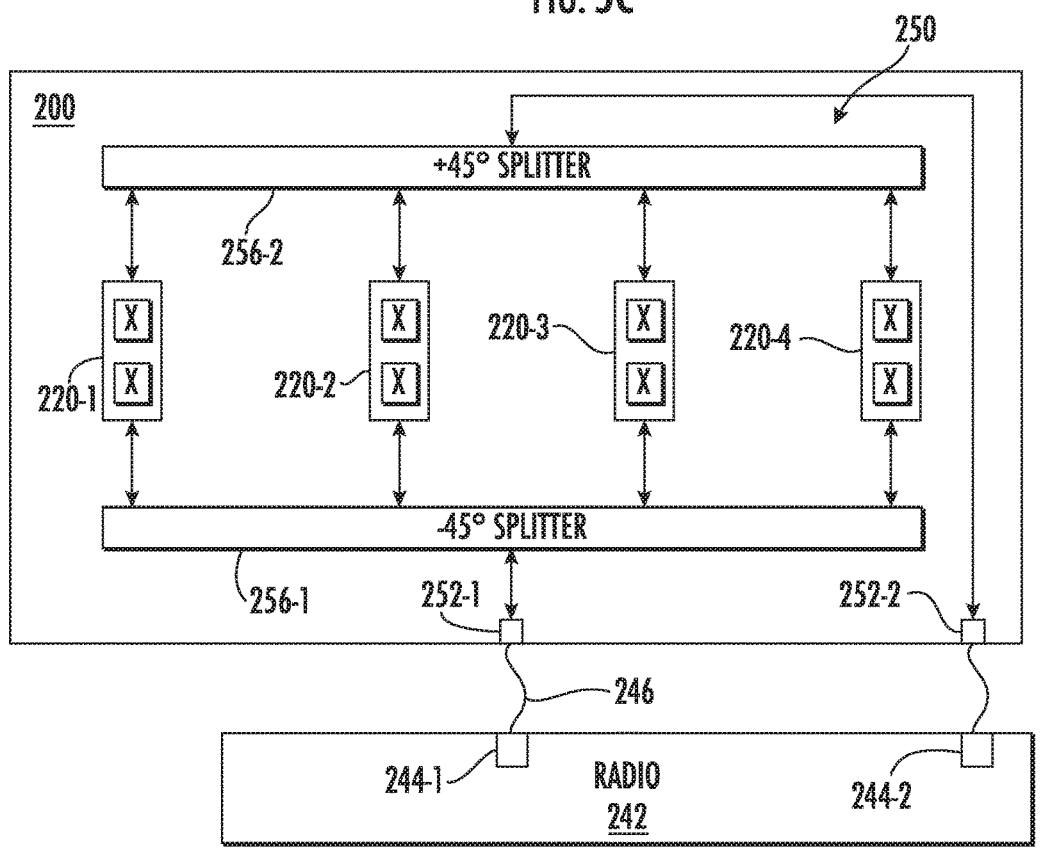
FIG. 6 is a block diagram illustrating a feed network that may be included in the small cell base station antenna of FIGS. 5A-5C.

FIG. 6 is a block diagram illustrating a passive feed network 250 that may be included in some embodiments of the base station antenna 200 of FIGS. 5A-5C. The passive feed network 250 may connect the radiating elements 222 to a radio 242. As shown in FIG. 6, the radio 242 has two ports 244-1 and 244-2. Duplexing of the transmit and receive channels is performed internal to the radio 242, so each port 244 on the radio 242 passes both transmitted and received RF signals. The antenna 200 may include two ports 252-1 and 252-2. Each port 244 on the radio 242 may be connected to a respective one of the ports 252 on the antenna 200 via a respective coaxial cable 246.

Each port 244 of radio 242 is coupled to all four linear arrays 220-1 through 220-4. One port 244-1 delivers signals having a −45° polarization to the linear arrays 220 while the other port 244-2 delivers signals having a +45° polarization to the linear arrays 220. In each case, the four linear arrays 220 may together transmit a quasi-omnidirectional antenna pattern in the azimuth plane. The feed network includes a pair of 4×1 splitter/combiners 256-1 and 256-2 that split the signals four ways to feed the four linear arrays 220. In some embodiments, the sub-components of each split signal may be fed to the respective linear arrays 220 with the same phase delay, while in other embodiments a phase taper may be applied to the signals fed to the two radiating elements 222 of each linear array 220 in order to affect electronic downtilts to the elevation pattern of the antenna beam.

In other embodiments, the antenna 200 may be implemented as an active antenna where amplitude and phase control may be performed for each radiating element 222. The amplitude and phase control may be performed at baseband, an intermediate frequency and/or at RF, as known to those of skill in the art. When the small cell antenna 200 is an active antenna, the amplitudes and phases of the sub-components of an RF signal that are fed to the radiating elements 222 may be adjusted to shape the antenna pattern on a symbol-by-symbol basis. Thus, the antenna pattern may be changed in real time. As discussed below, this capability may be used to counter the effects of sway in some embodiments.

As discussed above, pursuant to embodiments of the present invention, base station antennas are provided that include mechanisms to reduce sway and/or compensate for sway. FIGS. 7A and 7B are schematic diagrams illustrating one such method. In particular, FIG. 7A is a schematic diagram illustrating a small cell base station 300 that includes a strand-mounted remote radio head 310 with a small cell base station antenna 320 hanging therefrom via a ball-and-socket connection 330. FIG. 7B is a schematic diagram showing the ball-and-socket connection 330 in greater detail.

As shown in FIG. 7A, the remote radio head 310 may be hung from (or otherwise mounted to) the strand 302 via brackets 312 or other suitable mechanisms. A base station antenna 320 may be mounted to, for example, an underside of the remote radio head 310. The base station antenna 320 may be any suitable base station antenna including, for example, the base station antenna 200 of FIGS. 5A-5C. The base station antenna 320 may be mounted to the remote radio head 310 via a ball-and-socket connection 330. As shown in FIG. 7B, the ball-and-socket connection 330 may comprise a first rod 340 that has a first end 342 that is attached to the remote radio head 310. A second end 344 of the first rod 340 may have a spherical member 346 attached thereto. The ball-and-socket connection 330 further includes a second rod 350. A first end 352 of the second rod 350 includes a socket 354 that has a spherical internal cavity. A second end 358 of the second rod may be attached to the base station antenna 320. The socket has an opening 356 that receives the spherical member 346 of the first rod 340. A width of the opening 356 is sized to be less than a diameter of the spherical member 346 so that the spherical member 346 will not come out of the socket 354. The spherical member 346 may move freely within the socket 354. The ball-and-socket connection 330 may include lubricants, ball bearings or other mechanisms known to those of skill in the art that reduce friction between the spherical member 346 and the socket 354 so that the spherical member 346 may freely tilt and/or rotate within the socket 354.

In some embodiments, ballast material 322 may be included within (or attached to) the base station antenna 320. For example, stone, metal or other weights 322 may be placed in a lower portion of the base station antenna 320 which may help to reduce the amount that the base station antenna 320 moves in response to forces such as wind. Moreover, since the ball-and-socket connection 330 is used to attach the base station antenna 330 to the remote radio head 310, sway of the remote radio head 310 may generally not be transferred to the base station antenna 320. Thus, even if the strand 302 or the remote radio head 310 sway in the wind, the base station antenna 320 may exhibit much less sway. Preferably, the base station antenna 320 may have a small profile to reduce the amount that the base station antenna 320 sways in response to wind.

Either the strand 302 and/or the remote radio head 310 may sway in response to wind or other forces. When either the strand 302 and/or the remote radio head 310 sways, the ball-and-socket connection 330 allows the base station antenna 320 to move relative to the remote radio head 310. Moreover, the ballast material 322 acts to stabilize the base station antenna 320. As a result, only a portion of the sway of the remote radio head 310 will be transferred to the base station antenna 320. In other words, the combination of the ball-and-socket connection 330 and the ballast material 322 dampens the sway of the base station antenna 320. In some embodiments, a surface area of the base station antenna 320 may be less than a surface area of the remote radio head 310. In such embodiments, the base station antenna 320 may be less prone to sway in the wind than the remote radio head 310. The ballast material 322 may further stabilize the base station antenna 320. As such, the amount that the base station antenna 320 sways may be significantly less than the amount of sway of the remote radio head 310.

As described above, the base station antenna 320 may experience reduced levels of sway, but sway may not be completely eliminated. Accordingly, in some embodiment, the antenna pattern formed by the base station antenna 320 may be designed to take into account an expected amount of sway. For example, the small cell base station antenna 200 of FIGS. 5A-5C generates an antenna pattern that provides 360° coverage (i.e., omnidirectional coverage) in the azimuth plane, but directional coverage in the elevation plane. The 3 dB elevation beamwidth (i.e., the number of degrees in the elevation plane between locations where the main lobe of antenna pattern drops to half power on either side of the peak power) for the small cell base station antenna 320 may be designed to be wider than necessary for achieving a desired coverage area. Such a design reduces the gain of the antenna 320, and unnecessarily directs portions of the radiation into the ground and into the sky. However, by expanding the elevation beamwidth, the antenna 320 may be designed to provide sufficient gain throughout a cell even when the antenna 320 experiences limited amounts of sway (e.g., less than 10°). It should be noted that broadening the elevation beamwidth reduces the number of radiating elements required in each linear array of the small cell antenna 320, and hence may facilitate reducing the size of the antenna 320, which reduces the amount that the antenna 320 will sway in response to the wind. It is envisioned that, as shown in FIG. 7A, in some embodiments the antenna 320 may have 2-3 radiating elements per linear array, which may allow for small profile antennas, particularly when the antennas operate at higher frequencies such as frequencies in the 5 GHz band.

In the embodiment of FIGS. 7A-7B, the base station antenna 320 is mounted to the underside of the remote radio head 310. It will be appreciated, however, that in other embodiments, the ball-and-socket connection 330 may be used to mount the base station antenna 320 directly to a bracket or other element that is hung from the strand 302.

Figure 7C:
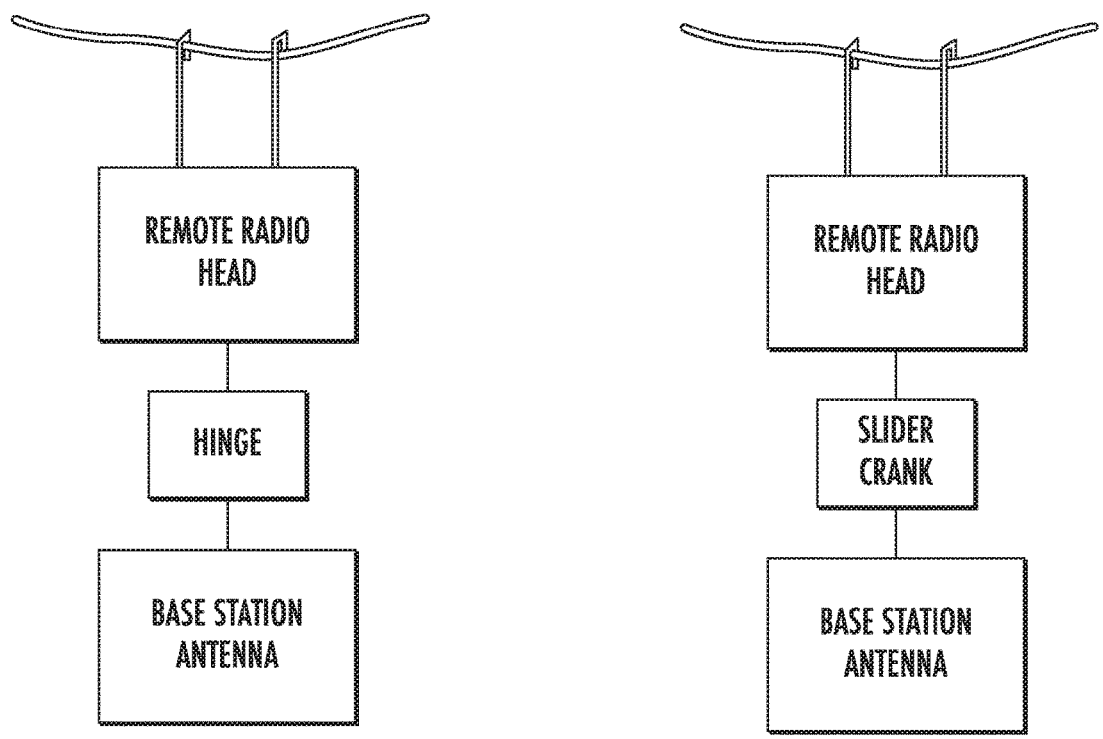
FIG. 7C is a series of schematic diagrams illustrating strand-mounted small cell base stations according to further embodiments of the present invention.
Figure 7C:
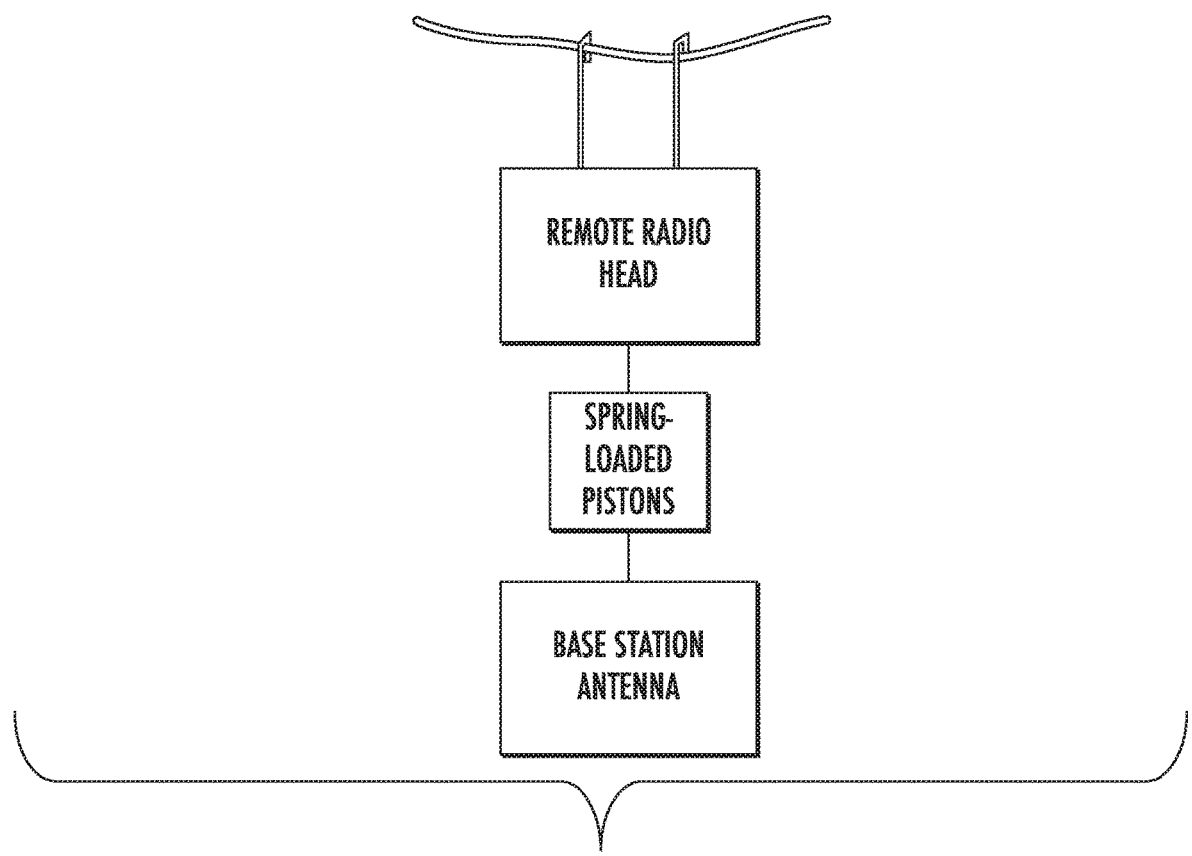

While a ball-and-socket connection is used in the embodiment depicted in FIGS. 7A-7B, it will be appreciated that in other embodiments different connections may be used that allow the base station antenna 320 to move relative to the remote radio head 310 and preferably, may move generally independently of the remote radio head 300. Examples of alternative mechanical linkages that connect the base station antenna 320 to the remote radio head 310 are those that may include spring-loaded pistons, slider crank mechanisms, hinges and the like. Such embodiments of the small cell base stations according to embodiments of the present invention are schematically illustrated in FIG. 7C.

Figure 8:
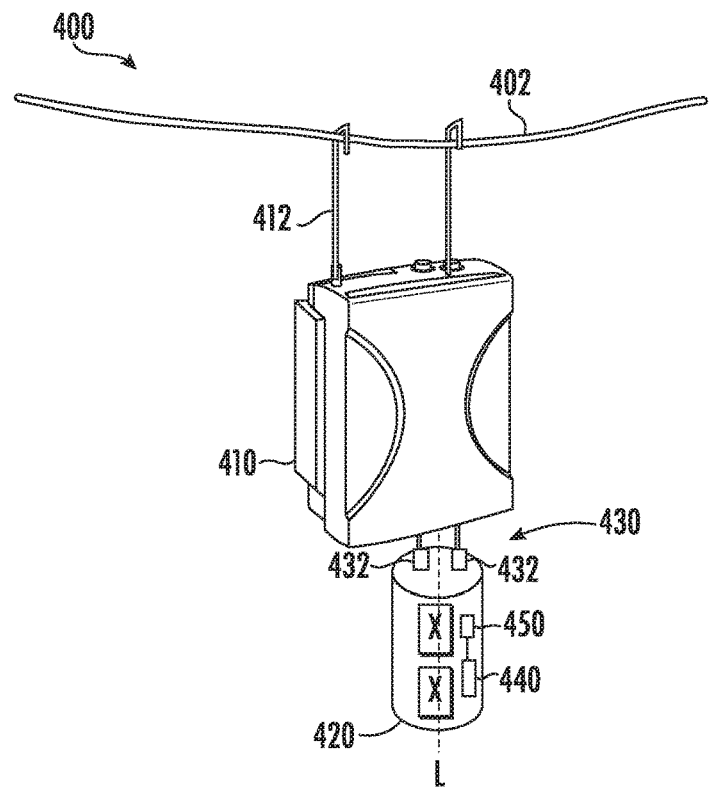
FIG. 8 is a schematic diagram of a strand-mounted small cell cellular base station according to embodiments of the present invention that includes an orientation sensor and a mechanical alignment system that adjusts the pointing direction of the antenna pattern to account for sway.

FIG. 8 is a block diagram of a small cell base station 400 according to further embodiments of the present invention. As shown in FIG. 8, the base station 400 includes a remote radio head 410 that is hung on a strand 402 by a bracket 412. A base station antenna 420 is connected to a lower surface of the remote radio head 410 via a mechanical linkage 430. The base station antenna 420 may comprise, for example, any suitable base station antenna including the small cell phased array base station antenna 200 of FIGS. 5A-5C.

In the embodiment of FIG. 8, the small cell base station 400 includes an orientation sensor 440 and a controller 450. The orientation sensor 440 and/or the controller 450 may be located in any suitable location, including within or attached to the base station antenna 420, as part of the mechanical linkage 430, or within or attached to the remote radio head 410. In the depicted embodiment, the orientation sensor 440 is located within the base station antenna 420. The orientation sensor 440 may generate orientation data that is indicative of an orientation of the base station antenna 420. The orientation sensor 440 may pass the orientation data to the controller 450. The mechanical linkage 430 may comprise, for example, a plurality of spring-loaded pistons 432, two of which are visible in the schematic diagram of FIG. 8. A length of each spring loaded piston 432 may be varied to change the orientation of the base station antenna 420 with respect to the remote radio head 410. The controller 450 may generate control signals based on the orientation data that is used to drive the spring-loaded pistons 432 in a manner that attempts to keep a longitudinal axis L of the base station antenna 420 perpendicular to the plane defined by the horizon despite sway of the base station antenna 420.

The orientation sensor 440 may comprise any sensor or combination of sensors that may sense one or more aspects of an orientation of the base station antenna 420 with respect to the plane defined by the horizon. In some embodiments, the orientation sensor 440 may determine the orientation of the base station antenna along three axes (e.g., yaw/pitch/roll orientation), while in other embodiments the orientation may be sensed along less than three axes (e.g., just the tilt of the base station antenna 420 from the vertical is sensed). The orientation sensor 440 may comprise, for example, a gyroscope, a three-axes accelerometer, a one-axis or two-axis accelerometer, a magnetometer and/or an inclinometer.

While in the embodiment of FIG. 8 the orientation data is used to drive one or more actuators (here spring-loaded pistons 432, although any appropriate actuators may be used) that adjust the orientation of the base station antenna 420 with respect to the plane defined by the horizon, it will be appreciated that in other embodiments the orientation data may be used to drive a plurality of actuators that adjust the orientation of individual radiating elements of the base station antenna 420.

Figure 9A:
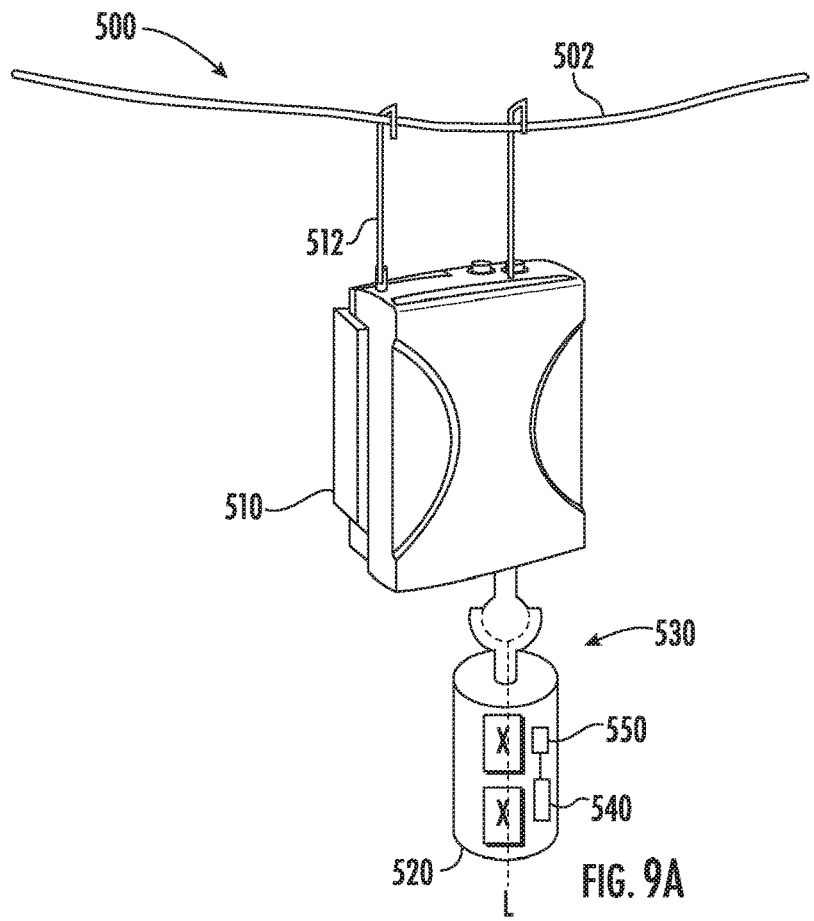
FIG. 9A is a schematic diagram of a strand-mounted small cell cellular base station according to embodiments of the present invention that includes an orientation sensor and active radiating elements that may dynamically adjust the antenna pattern to account for sway.

FIG. 9A is a block diagram of a small cell base station 500 according to further embodiments of the present invention. Referring to FIG. 9A, the base station 500 includes a remote radio head 510 that is hung on a strand 502 by a bracket 512. A base station antenna 520 is connected to a lower surface of the remote radio head 510 via a mechanical linkage 530. The mechanical linkage 530 may be a fixed mechanical linkage or may comprise a mechanical linkage that allows the base station antenna 520 to move relative to the remote radio head 510 such as, for example, any of the mechanical linkages discussed above with reference to FIGS. 7A-7C.

The base station antenna 520 may comprise, for example, any suitable base station antenna including the small cell phased array base station antenna 200 of FIGS. 5A-5C. The base station antenna 520 may have active antenna elements meaning that amplitude and/or phase of the sub-components of an RF signal that is to be transmitted (or received) through the individual radiating elements of the antenna 520, or at least subsets of each linear array of radiating elements, can be changed to alter the radiation pattern generated by the antenna 520. In the depicted embodiment, the amplitude and/or phase is varied at RF. As discussed below, this ability to modify the antenna beam formed by the base station antenna 520 may be used to change the shape of the antenna beam in response to sway of the base station antenna 520 in order to keep a relatively constant antenna pattern with respect to the covered cell despite sway of the antenna 520.

In the embodiment of FIG. 9A, the base station antenna 520 includes an orientation sensor 540 and a controller 550. The orientation sensor 540 and the controller 550 may be located in any suitable location, including within or attached to the base station antenna 520 or as part of the mechanical linkage 530. In the depicted embodiment, the orientation sensor 540 is located within the base station antenna 520. The orientation sensor 540 may generate orientation data that is indicative of a current orientation of the base station antenna 520. The orientation sensor 540 may pass the orientation data to the controller 550. The controller 550 may generate control signals based on the orientation data that are used to adjust the amplitude and/or phase of the sub-components of an RF signal at each of the radiating elements of the antenna 520 in order to dynamically change the antenna pattern generated by antenna 520 in order to counteract the effects of sway. In an example embodiment, the orientation data may be, for example, a three-axis pointing direction of one of the linear arrays included in the base station antenna 520. The orientation data may be compared to a lookup table in which amplitude and/or phase weights are stored for each radiating element for each possible pointing location (with the pointing locations defined in discrete steps). Table lookup techniques (perhaps with interpolation) may then be used to detect the amplitude and phase weights applied at each radiating element, and the controller 550 may be programmed to automatically change the applied weights in response to changes in the orientation data. In this manner the antenna pattern generated by base station antenna 520 may be dynamically changed so that the antenna beam will maintain relatively constant with respect to the cell despite sway of base station antenna 520.

As further shown in FIG. 9A, the base station antenna 520 may be mounted to the remote radio head 510 via a ball-and-socket connection 530 or some other mechanical linkage that allows the base station antenna 520 to move relative to the remote radio head 510. The use of such a mechanical linkage may reduce the amount that the base station antenna 520 moves in response to wind or other forces, which may reduce the amount that the antenna pattern must be dynamically changed.

FIG. 9B is a block diagram illustrating an example implementation of the active antenna elements included in the base station antenna 520. The base station antenna 520 may include a plurality of radiating elements 524 which may be arranged, for example, in four linear arrays 522 as in the base station antenna 200 described above with reference to FIGS. 5A-5C. Only a first of the four linear arrays 522-1 is illustrated in FIG. 9B to simplify the drawing, but it will be appreciated that everything to the left of the power coupler 560 will be repeated three additional times for the three additional linear arrays 522-2 through 522-4.

As shown in FIG. 9B, the base station antenna 520 is connected to the remote radio head 510 via, for example, a coaxial cable. The remote radio head 510 may generate an RF signal and pass the RF signal to the antenna 520. The RF signal may then be split by a power coupler 560 into a plurality of sub-components. Each sub-component of the RF signal is passed to a respective one of a plurality of transmit/receive paths 570. Each transmit/receive path 570 is connected to a respective one of the radiating element 524. In the example of FIG. 9B, each linear array 522 includes two radiating elements 524, but it will be appreciated that different numbers of radiating elements 524 may be included in each linear array 522 in other embodiments.

Each transmit/receive path 570 includes a first transmit/receive switch 572. The first transmit/receive switch 572 is provided because the base station antenna 520 is implemented as a time division multiplexed system in which signals transmitted from the base station antenna 520 to users and signals transmitted from users to the base station antenna 520 are transmitted at the same frequency but in different time slots. It will be appreciated that in other embodiments the base station antenna 520 may be designed to transmit and receive signals in different frequency bands.

The first transmit/receive switch 572 may be set either to feed data to be transmitted down a transmit signal path that extends between the power coupler 560 and the radiating element 524 or to feed signals received at the radiating element 524 down the transmit/receive path 570 to the power coupler 560. Transmit signals passed through the first transmit/receive switch 572 are passed to a variable attenuator 574 that may be used to reduce the magnitude thereof. The variable attenuator 574 may comprise, for example, a variable resistor that has a plurality of different resistance values that can be selected by application of a control signal. Each variable attenuator 574 may thus be used to reduce the magnitude of a signal supplied thereto by an amount determined by a control signal provided to the variable attenuator 574. The sub-component of the RF signal output by the variable attenuator 574 is passed to a variable phase shifter 576 that may be used to modify the phase of the sub-component of the RF signal. The variable phase shifter 576 may comprise, for example, an integrated circuit chip that may adjust the phase of an RF signal input thereto. A control signal supplied to the variable phase shifter 576 may select one of a plurality of phase shifts. The output of the variable phase shifter 576 is passed to a high power amplifier 578 that amplifies the sub-component of the RF signal to an appropriate transmit level. The amplified sub-component of the RF signal is then passed to the radiating element 524 for over the air transmission through a second transmit/receive switch 580.

When operating in receive mode, an RF signal may be received at the radiating element 524 and passed to the second transmit/receive switch 580. The second transmit/receive switch 580 passes the received RF signal to a low noise amplifier 582 that amplifies the received signal and passes it to an adjustable phase shifter 584. The output of the variable phase shifter 584 is passed to a variable attenuator 586 that may be used to reduce the magnitude of the received signal. The output of the variable phase shifter 586 is passed to the first transmit/receive switch 572 which passes the signal to the power coupler 560. The power coupler 560 combines the RF signals received at each of the eight radiating elements 524. The power coupler 560 passes the combined RF signal to the remote radio head 510.

Figure 10:
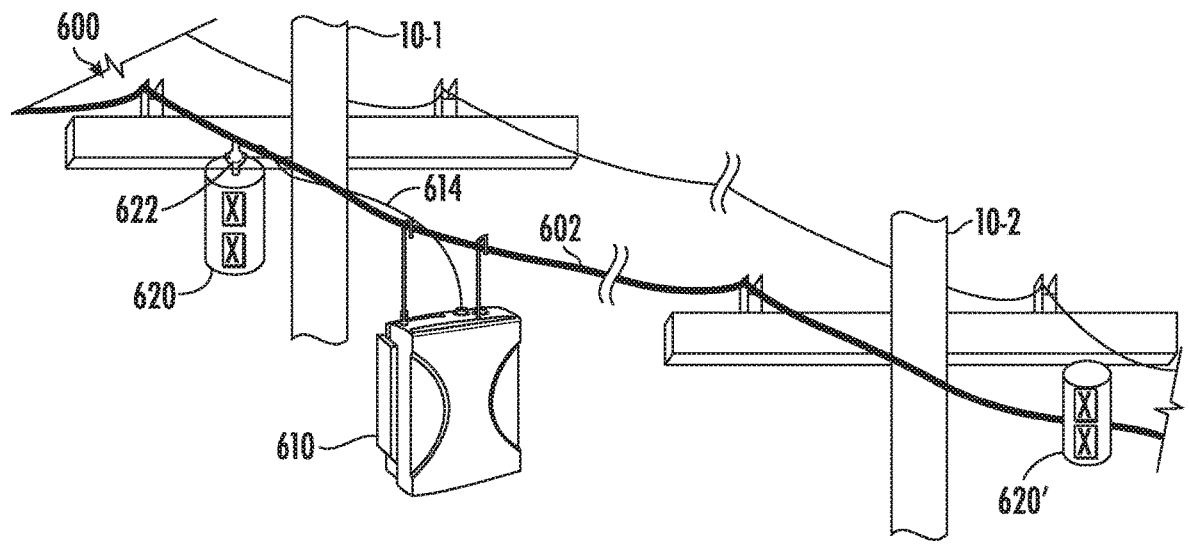
FIG. 10 is a schematic diagram of a strand-mounted small cell cellular base station according to embodiments of the present invention that is mounted separately from the remote radio head adjacent a pole to reduce the effects of sway.

FIG. 10 is a schematic diagram of a strand-mounted small cell cellular base station antenna 620 that is mounted separately from a remote radio head 610 as a further technique for combatting the negative effects of sway pursuant to embodiments of the present invention. As shown in FIG. 10, the base station antenna 620 is mounted separately from the remote radio head 610 so that sway of the remote radio head 610 will have reduced impact on the orientation of the base station antenna 620. In particular, the remote radio head 610 and the base station antenna 620 are mounted on an aerial strand 602 that extends between a first pole 10-1 and a second pole 10-2. The base station antenna 620 is mounted separate from the remote radio head 610. In the depicted embodiment both the remote radio head 610 and the base station antenna 620 are mounted between the first and second poles 10-1, 10-2, but in other embodiments the remote radio head 610 and the base station antenna 620 may be mounted on separate sides of one of the poles 10-1, 10-2. A coaxial cable 614 may connect the remote radio head 610 to the base station antenna 620 to pass data between the remote radio head 610 and the base station antenna 620. The coaxial cable 614 may also provide power to the base station antenna 620 in some embodiments. Additionally, the base station antenna 620 is mounted nearer to one of the poles 10-1, 10-2 that is the remote radio head 610. The portions of the strand 602 that are close to the poles 10 (where the strand 602 has a fixed mounting location) will tend to have less sway than portions of the strand 602 that are farther away from the poles 10.

In some embodiments, the base station antenna 620 may be mounted within ten feet of either the first pole or the second pole 10-1, 10-2. In other embodiments, the base station antenna 620 may be mounted within six feet of either the first pole or the second pole 10-1, 10-2. In still other embodiments, the base station antenna 620 may be mounted within three feet of either the first pole or the second pole 10-1, 10-2. The base station antenna 620 may be a phased array antenna in some embodiments. In some embodiments, the base station antenna 620 may be suspended below the remote radio head 610 via a mechanical linkage 622. For example, in some embodiments, the base station antenna 620 is suspended below the remote radio head 610 via a ball-and-socket connector 622. In other embodiments, a first portion of the base station antenna 620 may extend above the aerial strand 602 and a second portion of the base station antenna 620 may extend below the aerial strand 602. Such a base station antenna 620' is shown on the right side of FIG. 10. For example, the aerial strand 602 may extend through the base station antenna 620 or be attached to a side of the base station antenna 620. Having the base station antenna 620 mounted in this fashion can reduce or eliminate sway of the base station antenna 620 that is separate from sway of the aerial strand 602.

Figure 11:
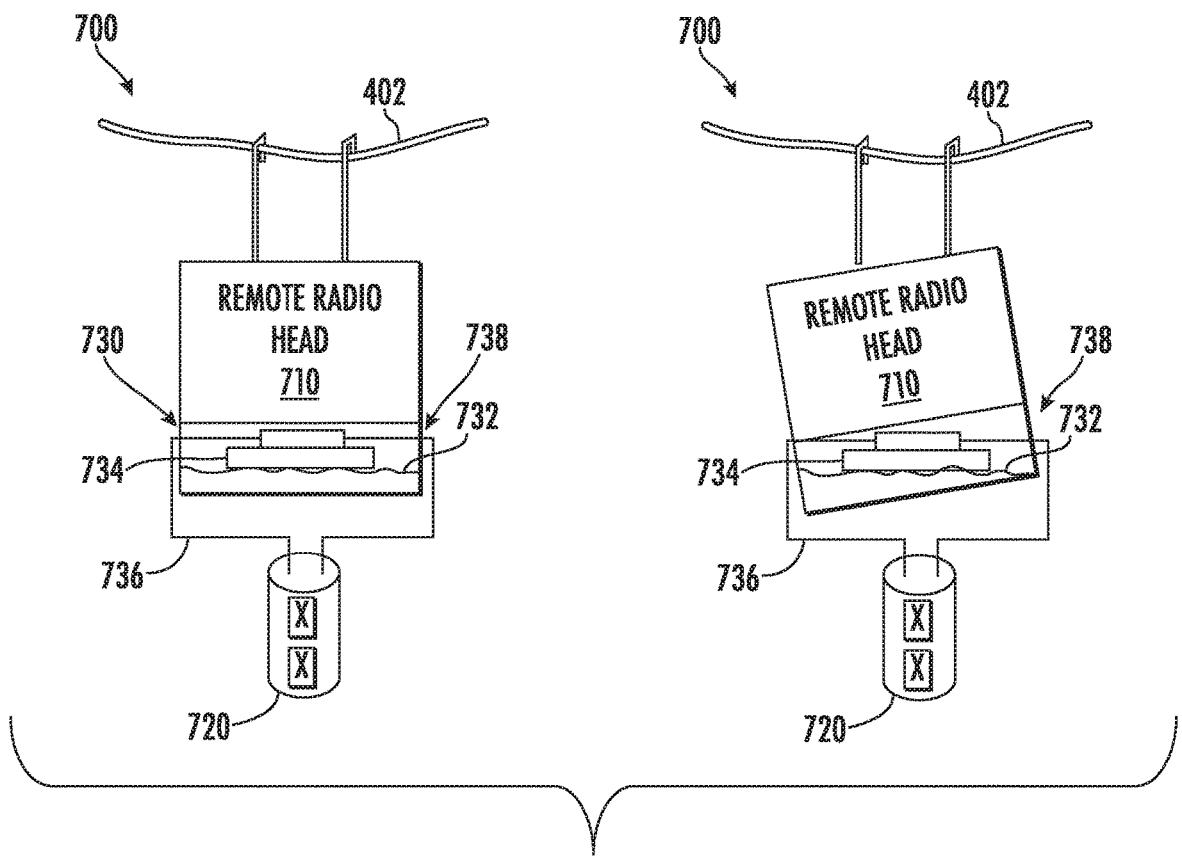
FIG. 11 is a schematic diagram of a strand-mounted small cell cellular base station according to embodiments of the present invention that uses a floating mechanical linkage between a remote radio head and a base station antenna.

FIG. 11 is a schematic diagram of a strand-mounted small cell cellular base station 700 according to further embodiments of the present invention that uses a floating mechanical linkage between a remote radio head 710 and a base station antenna 720.

As shown in FIG. 11, a compartment 730 is mounted on the lower surface of the remote radio head 710. The compartment 730 may be partially filled with a fluid 732 such as, for example, antifreeze. A float 734 may be floating in the fluid 732. A fixed mechanical linkage 736 may be attached between the float and the base station antenna 720. Valve slots 738 may be provided in the compartment 730 that allow the mechanical linkage 736 to extend through walls of the compartment 730.

As shown on the right side of FIG. 11, in the absence of sway, the base station antenna 720 may hang below the remote radio head 710 and a longitudinal axis of the base station antenna 720 may be generally perpendicular to the plane defined by the horizon. The right side of FIG. 11 illustrates what happens when the remote radio head 710 sways due to, for example, wind. As the remote radio head 710 tilts to one side, the surface of the fluid 732 remains parallel to the plane defined by the horizon due to gravitational forces. As such, the float 734 also remains parallel to the plane defined by the horizon. Since the base station antenna 720 is connected to the float 734 via a fixed mechanical linkage 736, the net effect is that the tilting of the remote radio head 710 does not result in a corresponding tilt of the base station antenna 720. The antenna 720 may be designed as a low profile antenna and may include ballast material in the manner described above so that the base station antenna 720 will only experience relatively small amounts of sway (since the mechanical linkage between the base station antenna 720 and the remote radio head 710 only corrects for sway of the remote radio head 710, and not for independent sway of the base station antenna 720 due to wind or other forces).

It will be appreciated that all of the above embodiments may be combined to provide additional embodiments. For example, ballast material may be included in the lower portion of any of the base station antennas described herein. Likewise, any and/or all of the base station antennas described herein may be low-profile base station antennas. The base station antennas described herein may each have antenna patterns that are wider in the vertical plane than necessary to cover a given cell in order to ensure sufficient coverage even when some degree of sway is present.

The present invention has been described above with reference to the accompanying drawings. The invention is not limited to the illustrated embodiments; rather, these embodiments are intended to fully and completely disclose the invention to those skilled in this art. In the drawings, like numbers refer to like elements throughout. Thicknesses and dimensions of some elements may not be to scale.

Spatially relative terms, such as "under", "below", "lower", "over", "upper", "top", "bottom" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly.

Well-known functions or constructions may not be described in detail for brevity and/or clarity. As used herein the expression "and/or" includes any and all combinations of one or more of the associated listed items.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention.

That which is claimed is:

1. A small cell base station, comprising:
a remote radio head that is configured for mounting on an aerial strand;
a phased array antenna; and
a mechanical linkage,
wherein the phased array antenna is suspended below the remote radio head via the mechanical linkage, and
wherein the mechanical linkage is configured to enable the phased array antenna to move relative to the remote radio head.

2. The base station antenna of claim 1, wherein the mechanical linkage comprises a ball-and-socket connector.

3. The base station antenna of claim 1, wherein the mechanical linkage comprises a hinge.

4. The base station antenna of claim 1, wherein the mechanical linkage comprises at least one spring-loaded piston.

5. The base station antenna of claim 1, wherein the phased array antenna includes ballast material in a lower portion thereof.

6. The base station antenna of claim 1, wherein the mechanical linkage is configured to enable the phased array antenna to substantially remain in a pre-determined orientation as the remote radio head sways.

7. A small cell base station, comprising:
a remote radio head that is configured for mounting on an aerial strand;
a phased array antenna having at least two columns of radiating elements,
an orientation sensor that is configured to generate orientation data;
a controller that is configured to receive the orientation data from the orientation sensor; and
at least one actuator that is coupled to the phased array antenna,
wherein the at least one actuator is configured to adjust positions of the radiating elements with respect to the remote radio head in response to the orientation data.

8. The small cell base station of claim 7, wherein the at least one actuator is configured to adjust the positions of the radiating elements in response to the orientation data in order to compensate for sway-induced movement of the phased array antenna.

9. The small cell base station of claim 7, wherein the at least one actuator is configured to adjust the positions of the radiating elements by adjusting a position of the phased array antenna relative to the remote radio head.

10. The small cell base station of claim 7, wherein the at least one actuator comprises a plurality of actuators that are configured to adjust the positions of each radiating element in response to the orientation data.

11. The small cell base station of claim 7, wherein the orientation sensor comprises a gyroscope.

12. The small cell base station of claim 7, wherein the orientation sensor comprises an accelerometer.

13. The small cell base station of claim 7, wherein the orientation sensor comprises an inclinometer.

* * * * *